Aug. 11, 1931.   M. SMITH-PETERSEN   1,818,007
SAFETY DEVICE FOR HOIST BRAKES
Filed Jan. 28, 1928   5 Sheets-Sheet 4

Fig.4.

Inventor
Morten Smith-Petersen,
By
Attorneys.

Aug. 11, 1931.  M. SMITH-PETERSEN  1,818,007
SAFETY DEVICE FOR HOIST BRAKES
Filed Jan. 28, 1928   5 Sheets-Sheet 5

Inventor
Morten Smith-Petersen

Attorneys

Patented Aug. 11, 1931

1,818,007

UNITED STATES PATENT OFFICE

MORTEN SMITH-PETERSEN, OF MILWAUKEE, WISCONSIN, ASSIGNOR TO NORDBERG MANUFACTURING COMPANY, OF MILWAUKEE, WISCONSIN, A CORPORATION OF WISCONSIN

SAFETY DEVICE FOR HOIST BRAKES

Application filed January 28, 1928. Serial No. 250,248.

This invention relates to hoisting devices and particularly to safety mechanisms for controlling powerdriven hoists, and the like.

Heretofore it has been usual to equip hoists and devices of similar character, with automatic devices which took the brake out of the control of the operator and applied the brake upon the occurrence of certain abnormal conditions. Among these were overspeed, failure of current to the driving motor, failure of the operator to slow down at a given point, over-winding, starting in the wrong direction, etc.

In the practical use of safety devices of this character serious risks have been encountered because when the automatic devices of the prior art operate to apply the brakes by the failure of current to drive the motor, it is impossible for the operator to release the brakes. There are certain conditions when the lives of miners will depend on the operator's ability to release the brakes. For example, in the event of a fire in the mine, the failure of the line current is a possible and even probable contingency. If a hoist loaded with men leaving the mine be stopped between levels by current failure, the safety of the men may be dependent on the ability of the operator to lower the hoist to a level at which the men can leave the car and make their way to the surface by the use of ladders.

The present invention meets this requirement by providing hand brake applying means which is normally in its inactive and off position, and which is not used in the ordinary operation of the hoist. In the event of a contingency, such as above suggested, the operator first moves the hand brake-applying means to apply the brakes and this conditions the power-applying brake so that the power application may be terminated. After the power brake has been released it is possible for the operator partially to release the hand brake and thus lower the hoist under manual control.

The invention involves hand operated means for applying a brake and a power operated means for applying a brake. Ordinarily the hand operated means would not be used but would stand in release position, and the power operated means would be used under the control of a hand actuated controlling mechanism.

In the preferred embodiment of the invention two separate brakes are used, one operated by the hand actuated device and the other operated by the power actuated device, but this is not essential, so long as there be some suitable braking means and two independently operable means, one for manually applying a brake and the other for applying a brake by power.

In its essential aspects the invention requires automatic applying means and some means for releasing the power applied braking force after automatic power application: also such a relation between the hand applying means and the last named releasing mechanism that the hand applying means must function as a condition precedent to the actuation of the power brake releasing means. It is also obviously necessary to the operativeness of the scheme that after the power brake has been released in the manner just suggested, the hand brake may be released, or at any rate partially released to permit the rotation of the drum under manual control.

Thus broadly considered the invention is not limited to any particular type of power brake or any particular type of automatic control for power brake, or to any particular arrangement of the brake instrumentalities upon the drum. However, there has been chosen for illustration a type of brake in which two individual brakes are used; in which the power brake is applied by a weight and released by a hydraulic cylinder, and in which automatic application is effected by a solenoid which is controlled in part at least by a speed responsive device driven by the rotating drum. In this particular embodiment the solenoid acts to disconnect the valve mechanism which controls the hydraulic cylinder from the manual control device normally used to actuate such valve mechanism, and upon such disconnection the solenoid moves the valve to brake applying position.

Figure 1:
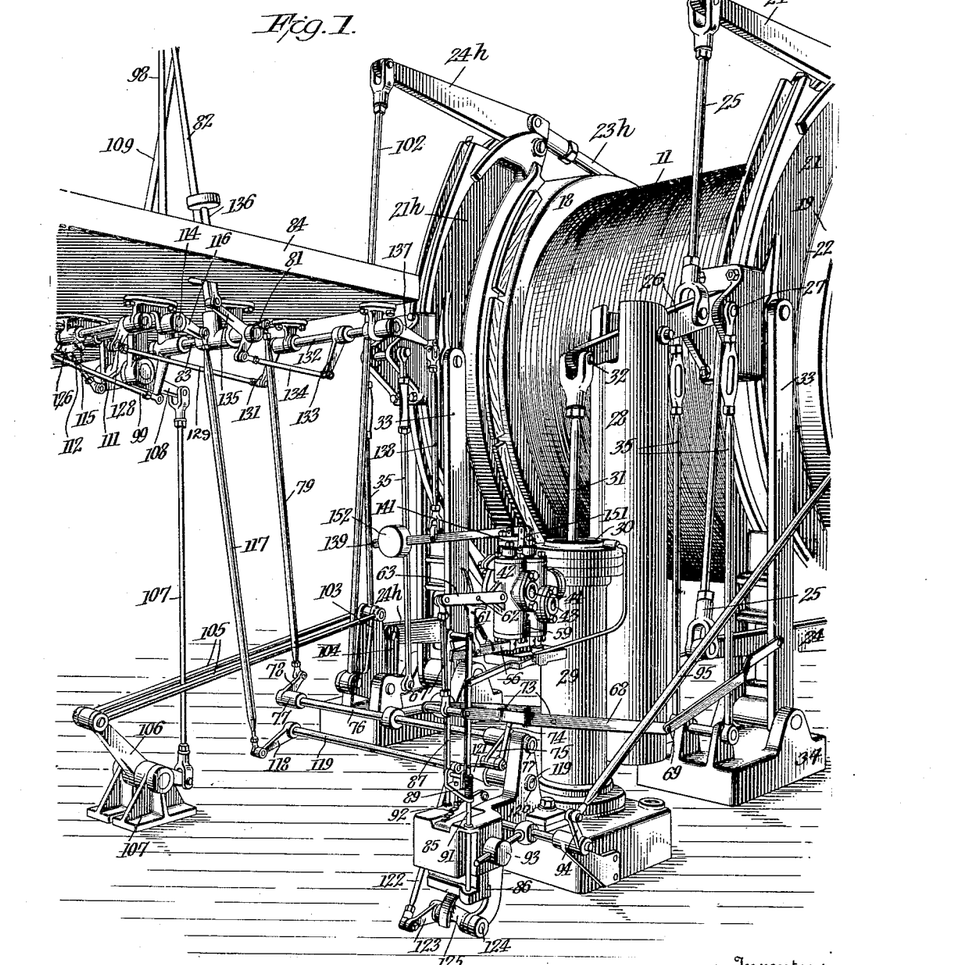
Fig. 1 is a perspective view of the hoist with its brakes and control connections.
Figure 2:
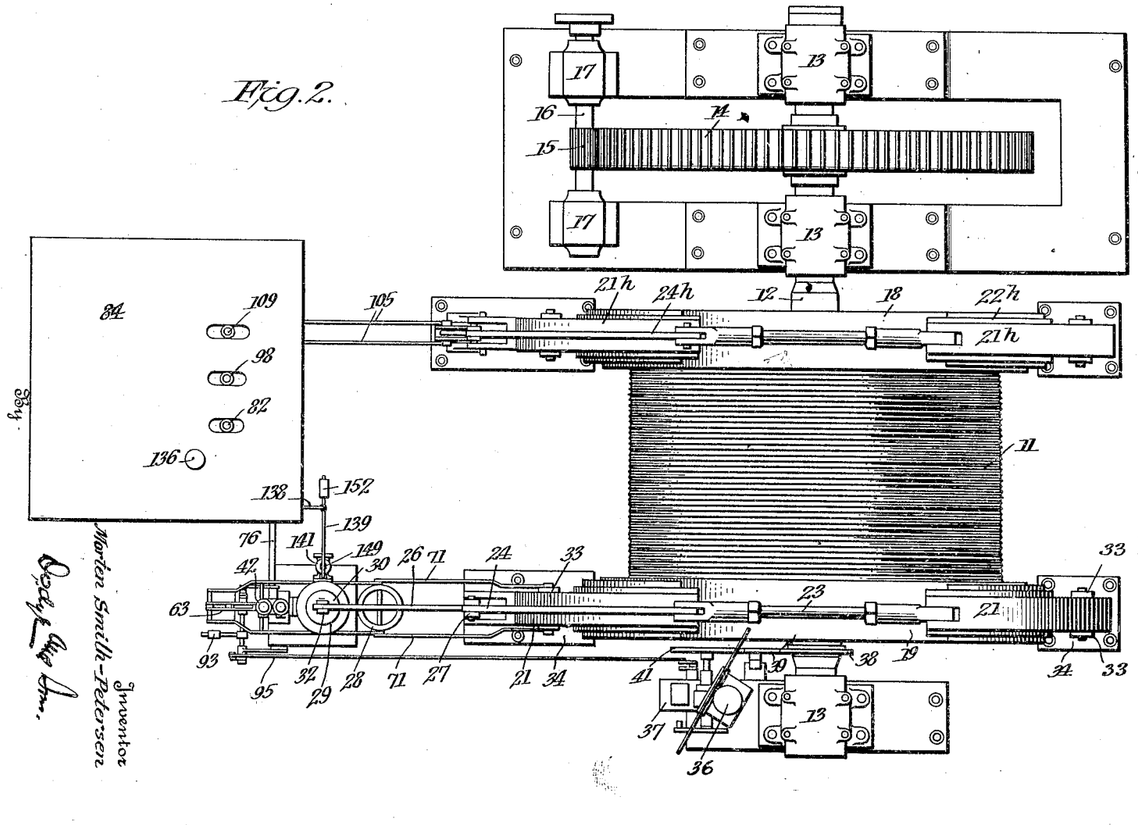
Fig. 2 is a plan view.
Figure 3:
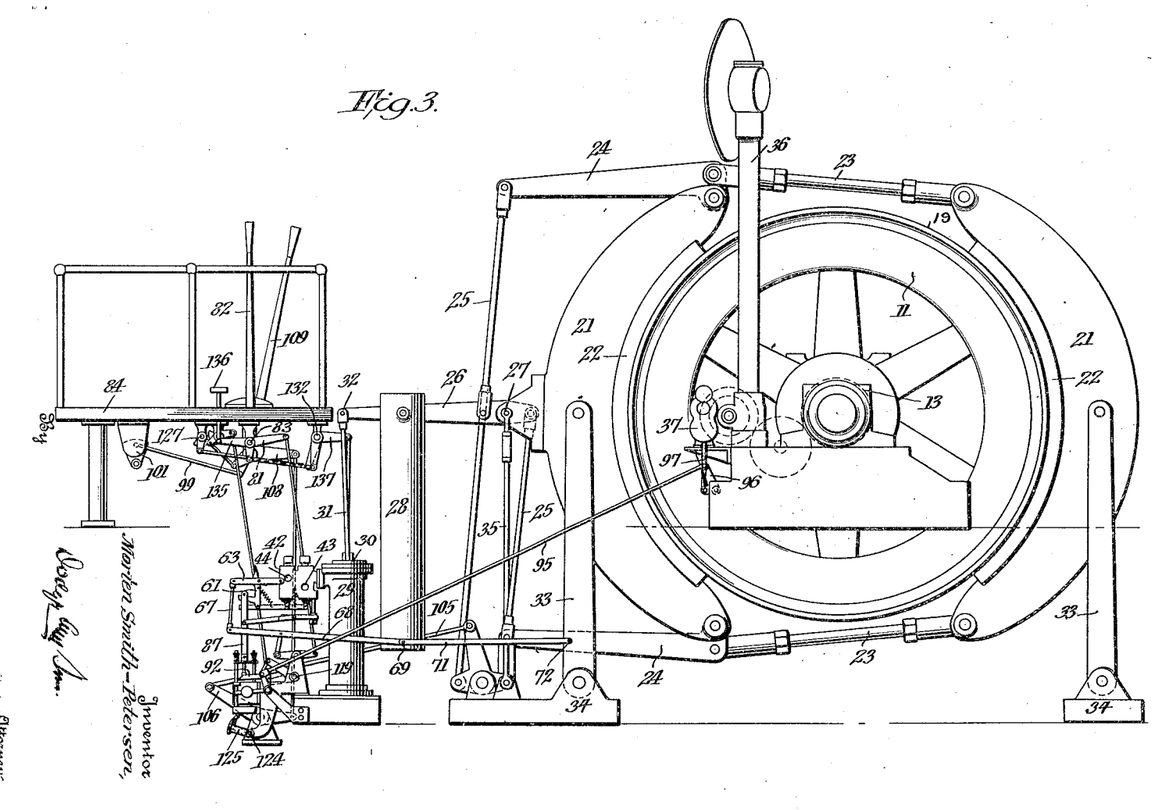
Fig 3 is a side elevation.

Referring first to Figs. 1, 2 and 3, an ordinary hoist drum is shown at 11 and is supported on the shaft 12 which turns in bearings 13. The shaft 12 carries a gear 14 and this meshes with a driving pinion 15. The pinion 15 is fast on a shaft 16 turning in bearings 17 and is directly driven by a motor, not shown, here assumed to be an electric motor. Certain advantages of the invention can undoubtedly be secured with other motors, but an electric motor is ordinarily used.

At opposite ends of the winding drum 11 are two brake drums. One of these is the hand brake drum 18 and the other is the power brake drum 19.

The power brake mechanism now to be described conforms to standard practice.

Two arcuate brake shoes 21 having the usual brake linings or facings 22 are connected together by adjustable links 23 and bell cranks 24 in a familiar manner so that when the bell cranks 24 are drawn toward each other the brake shoes are drawn together engaging the brake drum 19. The bell cranks 24 are so arranged as to have a large leverage and they are connected by links 25 to a lever 26 which is fulcrumed at 27 on one of the brake shoes 21. The points of connection of the links 25 to the lever 26 are relatively near the fulcrum 27 of the lever, and this lever carries at a point some distance from its fulcrum a weight 28 which because of its substantial mass and the high leverage ratio between it and the brake shoes 21, exerts a heavy braking pressure when the weight 28 is allowed to act. The weight and lever are lifted to release the brakes by a single acting piston 30 in the oil cylinder 29, which piston acts in thrust on a rod 31 pivoted at 32 to the lever 26.

The torque of the two brake shoes 21 is resisted by links 33, 33, which are pivoted to corresponding brake shoes 21 and to fixed base members 34 mounted on the foundation of the hoist. Tension links 35 steady the fulcrum 27 for the lever 26.

The numeral thirty-six indicates generally the so-called miniature or indicator which shows the position of the hoist car in the shaft and 37 indicates generally an automatic device which responds to overspeed, overwinding, etc., to control the hoist. These are standard articles of commerce, are not features of this invention, and hence will not be described in detail.

The miniature and the safety device 37 are driven from the shaft 12 by a gear train 38, 39, 41, so that these parts are driven with the same speed characteristics and in a definite relation with the hoist drum. The cylinder 29 is a single acting cylinder so arranged that pressure fluid acting in its lower end forces the plunger 30 upward. The admission of pressure to and its exhaust from the lower end of cylinder 29 is controlled by a double poppet valve mechanism mounted in the housing 42 which controls a port leading to the lower end of the cylinder 29.

The housing 42 has two connections, a high pressure connection 43 and a low pressure connection 44. The low pressure connection 44 is connected to a sump into which it discharges oil released from the cylinder 29. From the sump the oil is drawn by a pressure pump and stored under high pressure in an accumulator connected to the high pressure connection 43. The sump, pump and accumulator are not shown in the drawing, as they involve no novelty and as their construction and use are familiar to those skilled in the art.

Figure 5:
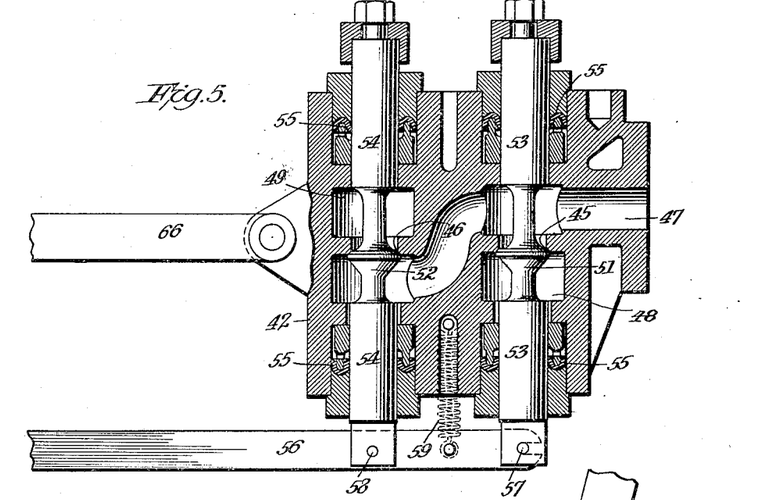
Fig. 5 is a vertical section of the admission and discharge valve which normally controls the oil cylinder.

The housing 42 contains a high pressure valve seat 45 and a low pressure valve seat 46. The passage through the seat 45 controls communication between the cylinder port 47 and high pressure chamber 48 to which high pressure oil is conducted by the high pressure connection 43. The passage through the seat 46 connects the cylinder port 47 with a low pressure chamber 49 from which the low pressure connection 44 leads. Coacting with the seat 45 is a balanced poppet valve 51 and coacting with the seat 46 is a balanced poppet valve 52. The balancing is effected by mounting these poppet valves on suitably proportioned plungers 53 and 54 respectively which extend completely through the housing 42 and which are packed where they emerge from the housing 42 by means of cup leathers 55. This type of valve is known in the art and a detailed description of its construction, beyond that already given, seems unnecessary.

The two plungers 53 and 54 are pivoted to a lever 56, the plunger 53 having a pin and slot connection 57 and the plunger 54, a simple pivot connection 58 with the lever. The spring 59 acting in tension between the housing 42 and the lever 56 at a point midway between the pivots 57 and 58, is of such strength as to hold both valves normally closed against their seats. By moving the lever in reverse directions from the position just mentioned either valve may be opened selectively. Thus as the lever 56 moves upward high pressure valve is opened, the low pressure valve remaining closed. High pressure is admitted to the lower end of cylinder 29. Piston 30 moves upward lifting weight 28 and releasing the brake shoes 21. Movement downward from the position last mentioned first closes the valve 51 and then opens the valve 52 discharging the high pressure fluid from the cylinder 29. In such case piston 30 is moved downward by weight 28 and the weight applies the brake shoes 21 to brake drum 19.

The lever 56 is connected by a latch 61 with a pin 62 on the lever 63. The latch is urged in engaging direction by a spring 64 and carries a tail 65 which may be depressed to release the latch. The lever 63 is pivoted at 66 on the housing 42 and is connected by a link 67 with one end of a floating lever 68 made in the form of a yoke or frame straddling cylinder 29 and weight 28. The other end of this floating yoke lever is pinned at 69 to opposite sides of the lower end of the weight 28. A pair of guide links 71 are pinned at 69 to the weight 28 and at 72 to the strut link 33. Pivoted to cross bar 73 of floating lever yoke 68 is a link 74 which is connected to an arm 75 on a shaft 76. The shaft 76 is mounted in bearings 77 supported on the base of cylinder 29 and carries an arm 78 which is connected by link 79 to an arm 81. The arm 81 is fast on the brake control lever 82 and is swiveled on a fixed shaft 83 mounted in brackets below the control platform 84. The brake-off position of the hand lever 82 is to the right in Fig. 3.

In all the figures the mechanism is shown in the position assumed when the power brake mechanism is partially applied. When the lever 82 is drawn to the left from the off position just described, shaft 76 is turned counterclockwise and the fulcrum 73 of floating lever yoke 68 is consequently lowered. The effect is to lower the lever 63 and, assuming that the latch 61 is engaged, the lever 56 is similarly lowered. This opens the discharge valve 52 and permits the weight 28 to apply the brakes. The consequent downward movement of the weight 28 lowers the fulcrum pin 69 of the floating lever 68 and tends to swing the lever 63 and the connected lever 56 upward. The lever 68 will therefore move only far enough to close valve 52 without opening the valve 51, at which time the weight 28 must come to rest. It follows that the weight 28 keeps step with the progressive movements of lever 82. Thus the brake may be applied with any desired force by setting the lever 82 in its various positions.

The automatic control mechanism which applies the power brake upon the occurrence of any abnormal condition, or as the result of faulty manipulation, acts to disengage the latch 61 and then to draw the lever 56 downward. As already explained such downward movement applies the power brake by causing the weight 28 to move downward.

Many automatic control mechanisms are known, but the one here shown includes a solenoid 85 which has a plunger armature 86 extending through the solenoid and connected by a thrust rod 87 with a cross bar 88 which overlies the tail 65 on latch 61. If the plunger armature 86 is released by deenergization of the solenoid 85 it immediately drops by its own weight and by the action of two springs 89 on the guide rods 91. Such downward motion causes the bar 88 to engage the tail 65 and release the latch 61. The motion of the latch in releasing direction is limited by the collision of the tail 65 with the lever 56 so that the solenoid armature first disengages the latch and then draws the lever down to discharge pressure fluid from the cylinder 29 and apply the brakes.

The energization of the magnet 85 is controlled by known means which need not be described beyond pointing out that these means function in the event of one or more of such contingencies as overspeeding, overwinding, failure to slow-up at certain points in the travel of the cage, starting in the wrong direction, failure of current to the driving motor, and various other known contingencies which customarily require the operation of an automatic brake applying device of this character.

The mechanical connections for effecting certain of these functions include the step block 92, counterweight 93, bell crank 94, link 95, bell crank 96 and link 97. These form a mechanical connection of known type between a commercial hoist governor 37 and the solenoid trip structure 85. The details of its operation are immaterial beyond the fact that when it functions the armature plunger 86 drops. So long as the armature remains in its lower position the latch 61 is disengaged and the lever 56 is held in its lowermost position.

There is a lever 98 on the control platform 84 which actuates, through a link 99, a motor controlling device 101 which controls the operation of the main hoist-driving motor in both directions of rotation.

The mechanism so far described, with the single exception of the brake drum 18, is a standard commercial structure for which no patentable novelty is here claimed. It is illustrated and described merely to explain one mode of applying and the utility of the present invention.

The added structure embodying the present invention performs the following functions: First, it applies a brake to the drum 18 and simultaneously lifts the armature plunger 86 part way up; that is, far enough to permit valve 52 to close but not far enough to cause valve 51 to open. The motion of the hand brake mechanism to the position just described also releases an interlock between the hand brake mechanism and a manually actuated secondary valve mechanism which functions to admit oil under pressure from the accumulator or preferably from an auxiliary accumulator always maintained charged for this emergency use only, to the cylinder 29. This raises the plunger 30 and releases the brake shoes 21. When this has been done the hand brake can be partially released to permit the rotation of the drum 11 under manual control.

The complete releasing movement of the hand brake can not be effected until the foot actuated mechanism is restored to its normal position, the interlock above mentioned assuring this sequence of operations. The restoration of the foot actuated mechanism cuts off the auxiliary supply of oil to the cylinder, after which complete release motion of the hand brake restores the solenoid plunger 86 to its lowermost position and reapplies the power brake by again venting cylinder 29.

It follows that when the power brake has been caused to apply by automatic safety means, it can be released only by applying the hand brake. The hand brake can, thereafter, be completely released only by a manipulation which will cause the power brake automatically to reapply.

The hand brake shoe mechanism which engages the brake drum 18 is essentially identical with the power brake shoe mechanism. There are brake shoes 21ʰ with facings 22ʰ and connected by links 23ʰ, and bell cranks 24ʰ. The upper bell crank 24ʰ is connected by tension links 102 with one arm of a three armed bell crank 103. The lower bell crank 24ʰ is connected by a strut link 104 with another arm of bell crank 103. The third arm of bell crank 103 is connected by links 105, bell crank 106 and link 107 with arm 108 on brake applying hand lever 109.

Figure 4:
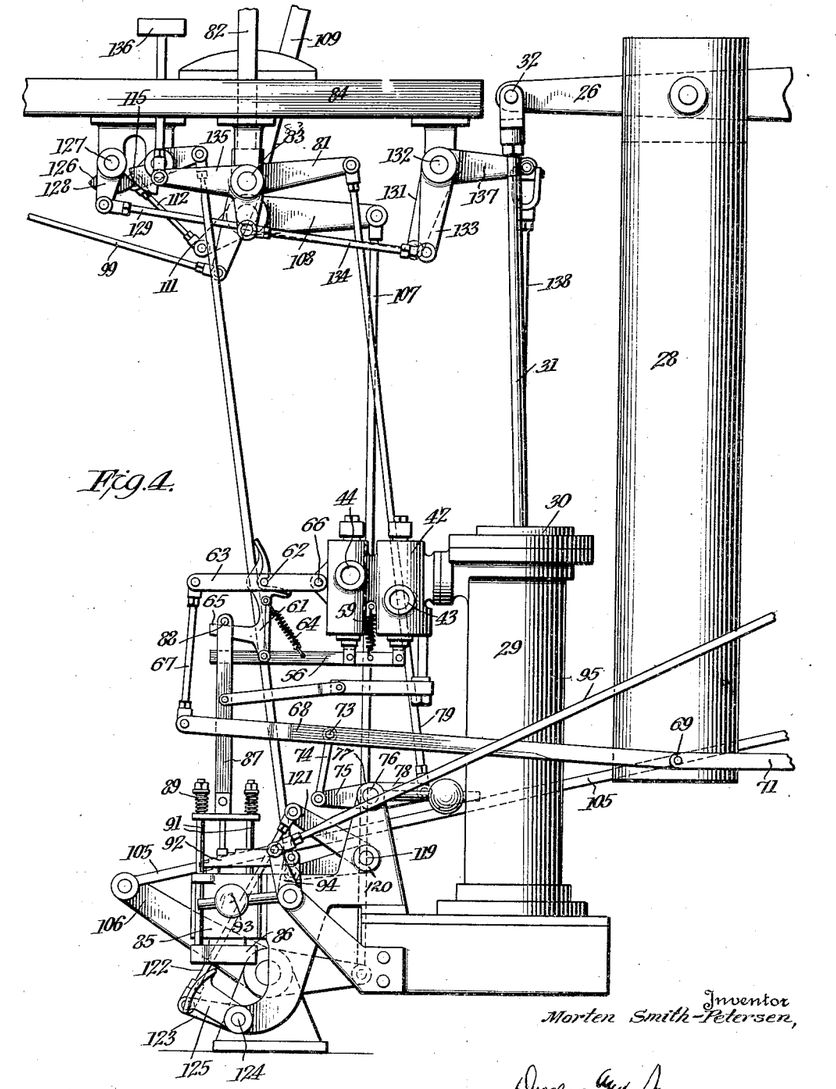
Fig. 4 is an enlarged fragmentary view of a portion of Fig. 3.

By tracing the linkage through it will be observed that the hand brake is released when the lever 109 is to the right as viewed in Figs. 3 and 4.

Formed integrally with the arm 108 is a second arm 111 which is connected by a link 112 with an arm 113. The arm 113 is fast on a shaft 114 which carries a sector shaped interlock block 115 and also an arm 116 which is connected by link 117 with arm 118 on shaft 119. The shaft 119 is mounted in bearing 120 and in other ordinary bearings which would not be visible in any figure except Fig. 1, and which have been omitted from Fig. 1 to simplify the drawings.

The shaft 119 carries an arm 121 which is connected by a link 122 with an arm 123 journaled on shaft 124 beneath the solenoid 85. Integral with arm 123 is a cam 125 which when the arm 123 swings clockwise will engage and lift the solenoid plunger 86 far enough to permit lever 56 to move to that position in which both valves 52 and 51 are closed, i. e., the position shown in Fig. 5.

The working face of the cam 125 is arcuate so that the cam 125 may move through a considerable angle, (i. e., a considerable braking range) while the plunger 86 remains in the raised position just mentioned. The connections are so dimensioned that the cam 125 raises the plunger 86 only after the lever 109 has been drawn away from the normal brake-released position.

The interlock sector 115 coacts with a similar interlock sector 126 fast to the shaft 127 parallel with the shaft 114. In the normal or brake releasing position of lever 109, sector 115 obstructs the motion of sector 126 but if lever 109 be moved a short distance (with reference to Figs. 3 and 4) sector 115 swings counterclockwise and frees sector 126 to move counterclockwise. Fast to shaft 127 on which sector 126 is mounted is an arm 128 and this is connected by a link 129 with an arm 131 fast on shaft 132. Shaft 132 is connected by arm 133, link 134 and bell crank 135 with a treadle 136. Consequently the moving of lever 109 to brake applying position is a necessary precedent to the depression of treadle 136. The depression of this treadle rocks the shaft 132 and such motion of this shaft serves through the arm 137, link 138 and weighted lever 139 to open the auxiliary admission valve whose housing is indicated at 141. This admits oil under pressure from the accumulator or preferably an auxiliary or emergency accumulator to the lower end of cylinder 29. It will be observed that downward movement of the treadle 136 moves sector 126 into the return-motion path of sector 115, so that release of the treadle 136 is necessary before the complete brake releasing movement of lever 109 can take place.

Figures 6, 7:
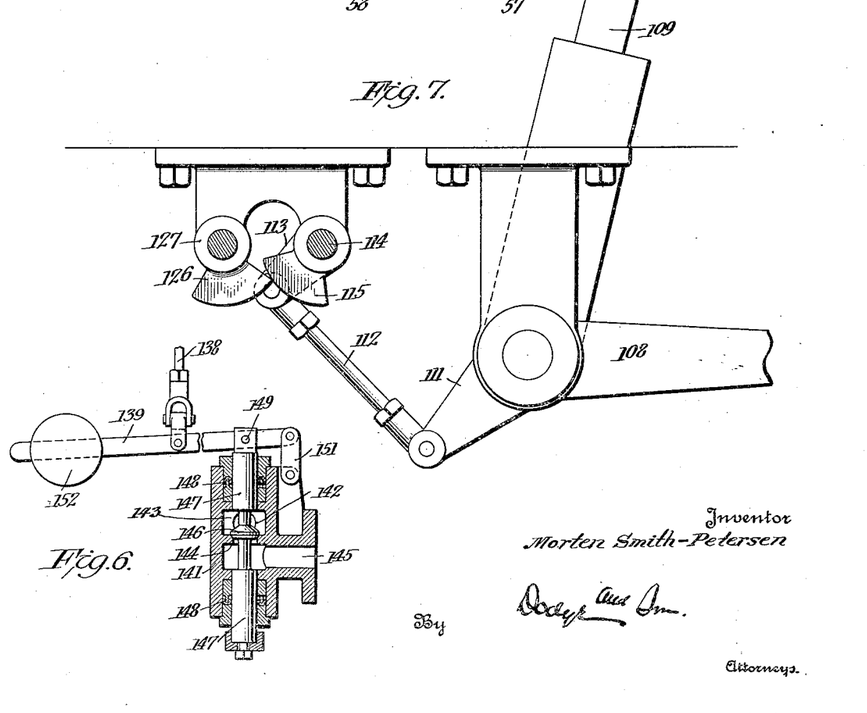
Fig. 6 is a similar section of the emergency oil admission valve used with the oil cylinder.
Fig. 7 is a detailed view of the interlock which prevents the release of the automatic brake in emergency until the hand brake has been applied.

The auxiliary oil admitting valve is shown in section in Fig. 6. The housing 141 has a high pressure oil connection 142 leading to a high pressure chamber 143 within the housing. The chamber 143 is separated by a valve seat 144 from a cylinder port 145 which leads to the lower end of cylinder 29. In other words port 145 is in communication with cylinder port 47 of housing 42. A balanced poppet valve 146 mounted in a plunger 147 extending through the housing 141, actuates the valve and is sealed against leakage by cup leathers 148. The plunger 147 is pivoted at 149 to the weighted lever 139 which is supported by strut links 151 pivoted to the lever and to a portion of the housing 141 and used to permit right line motion of plunger 147. The weight 152 on the lever 139 is for the purpose of urging the valve closed and restoring the treadle 136 to its uppermost position unless it be held down.

Assume that a hoist equipped as above has been stopped by the operation of the automatic control means. The above statement implies that plunger armature 86 has dropped, disengaged the latch 61 and moved latch 56 downward to open valve 52. The operator can regain control of the drum 11 by the following manipulations. He first drawns lever 109 to the left with reference to Figs. 3 and 4, far enough to apply the hand brake to drum 18 and preferably with sufficient force to hold the drum against rotation. This motion shifts the cam 125 so that it lifts plunger 86 far enough to close valve 52 without opening valve 51. Such motion of lever 109 has moved sector 115 out of obstructing position relatively to sector 126 so that the operator may by depressing treadle 136 and retaining it depressed admit oil pressure to cylinder 29, to lift plunger 30 and weight 28 and release power actuated brake shoes 21. He may then release the hand actuated brake shoes 21$^h$ by moving lever 109 to the right relatively to Figs. 3 and 4. In this way he may lower the cage (it is here assumed that the driving motor is inoperative under the circumstances mentioned) to some level at which it may be unloaded, whereupon he may cause the automatic reapplication of the power actuated brake shoes 21 by releasing treadle 136 and then moving lever 109 to the right.

As stated above the valve 141 may be fed by the main accumulator, but it is safer to use an auxiliary accumulator maintained charged at all times and used only in emergency. I prefer an arrangement where the auxiliary accumulator is fed by the same pumps as the main accumulator, but the connections are arranged to ensure charging of the auxiliary accumulator in preference to the main accumulator, so that the auxiliary accumulator is maintained fully charged at all times. This detail is not essential and is not here claimed as any suitable source or sources of pressure fluid may be used.

While I have described and prefer the particular form of power applied brake here described, the invention is not limited to use with this particular brake.

What is claimed is,—

1. The combination of a rotary drum; braking means therefor; a brake actuating device operable by manual force; a brake actuating device operable by mechanical power; a manually operable controller for the second named actuating device; automatic means uncontrolled by the manually operable controller and operable to cause the second named actuating device to apply the brakes; manually operable releasing means for actuating the second named actuating device to release the brakes after actuation by said automatic means; and means controlled by the position of the first named actuating device, and serving to render said releasing means inoperative when said first named actuating device is in brake releasing position.

2. The combination of a rotary drum; braking means therefor; a brake actuating device operable by manual force; a brake actuating device operable by mechanical power; a manually operable controller for the second named actuating device; automatic means for disconnecting said controller from said actuating device and for causing the latter to apply the brakes; manually operable releasing means for causing the second named actuating device to release the brakes after application by said automatic means; and means controlled by the position of the first named actuating device and serving to render said releasing means inoperative when said first named actuating device is in releasing position.

3. The combination of a rotary drum, two interrelated braking instrumentalities therefor, one of which is actuated directly by manual force and the second of which is actuated by mechanical power normally under manual control; automatic means for taking the second braking instrumentality out of manual control and causing it to apply with full power; releasing means independent of said normal manual control for releasing said second braking instrumentality; and means controlled by the first braking instrumentality and serving to render said releasing means inoperative save when said first braking instrumentality is at least partially in braking action.

4. The combination of a rotary drum; two braking mechanisms therefor; a manually operable mechanism for actuating one braking mechanism; a power operated mechanism for actuating the other braking mechanism; a manually operated control device for said mechanically operated brake mechanism; automatic means beyond control by said manual controller and serving to cause said mechanically actuated applying means to function; releasing means independent of said manually operable controlling means, for causing said mechanical applying device to release the brakes after application by said automatic means; and an interconnection between the manual means for applying the first brake and said releasing means serving to render the latter inoperative except when said manually operated brake is at least partially applied.

5. The combination of a rotary drum; a brake therefor; a manually operated means for applying said brake; a second brake; power actuated device for applying said second brake; releasably connected manually actuated controlling means for said power actuated device; automatic means for interrupting said releasable connection and for causing said mechanical means to apply the brakes; manually operable means independent of said manually actuated controlling means for releasing the brakes after application by said automatic means; and a connection between the manually operated brake mechanism and said releasing mechanism for the power operated brake, arranged to render said releasing mechanism inoperative save when said manually operated brake is shifted from full release position.

6. The combination of a rotary element; two brake mechanisms therefor; means for applying one of said mechanisms manually; means for applying the other of said mechanisms by mechanical power, said means including a pressure motor and a valve mechanism for controlling the same; a manually operable controller; a releasable connection between said controller and said valve mechanism; an automatic stop device including means for releasing said releasable connection and shifting said valve mechanism to brake applying position; a secondary valve operable in the neutral position of the first named valve mechanism to cause said motor to release the brakes; manually operable means for actuating said secondary valve; a mechanical interlock between the last named manual means and the means which manually applies the first brake, so arranged that the motion of the latter to brake applying position releases the former; and a device connected to be operated by the same movement of said manual brake applying means and serving to move the first named valve device to neutral position.

7. The combination of a hoist; power braking means therefor; a manual control device for said braking means; automatic means arranged to apply said brakes and prevent release thereof by said manual control device; an independently operable manual brake; and means operatively associated with the last named brake, and rendered operable by the movement thereof from release position, to release at the will of the operator said power braking means.

8. The combination of a hoist; power braking means therefor; a manual control device for said power braking means; automatic means responsive to an abnormal condition to cause said power braking means to apply the brakes and prevent the release thereof by said manual control device; an independently operable manual brake applying means; and an emergency releasing means for the power braking means operatively related to said manual brake applying means and effective only in the brake applying position thereof.

9. The combination of a hoist, a fluid pressure operated braking means therefor; a valve controlling said braking means; a manual control device for said valve; automatic means responsive to an abnormal condition and serving to disconnect said valve from said control device and operate the valve to apply the brakes; an independent manually operable brake applying means; an emergency releasing means for the power braking means; and connections between said independently operable manual brake applying means and said emergency releasing means whereby the latter becomes effective only when the former is applied.

10. The combination of a rotary element; braking means therefor; a brake applying means operable by manual force; a fluid pressure actuated brake applying means; a valve device for controlling the last-named means and having application, lap and release positions; a manually actuated controller for said valve device; a releasable operative connection between said controller and said valve device; a safety device responsive to an abnormal condition and then operative to release said operative connection and cause said valve device to move to application position; an auxiliary valve operable in the lap position of said valve device to cause the fluid pressure means to act to release the brakes; operator actuated means for causing said auxiliary valve to function; a device for preventing the actuation of the last named means except when the manually actuated applying means is in applying position; and means for moving said valve device to lap position by the applying movement of said manually actuated applying means.

11. The combination of a rotary element; braking means therefor; a brake applying means operable by manual force; a fluid pressure actuated brake applying means; a control valve for the last named means having application, lap and release positions; a manual actuator for said control valve; a releasable latch forming the operative connection between said manual actuator and said control valve; a safety device having a movable part which shifts upon occurrence of an abnormal condition; a connection between said movable part and said latch so arranged that the motion of said part first disengages the latch and then shifts the control valve to application position; an auxiliary valve effective in the lap position of said control valve to release the pressure actuated brake applying means; operator actuated means for causing said auxiliary valve to function; an interlock between the last named means and the manually actuated applying means arranged to prevent the actuation of said auxiliary valve except when the brake means is manually applied; and connections between said manually actuated applying means and said controlling valve whereby the manual application of the brakes temporarily restores said controlling valve to lap position.

12. The combination of a rotary drum; braking means therefor; brake applying means including a power mechanism; automatic means responsive to abnormal conditions and controlling said power mechanism to brake said drum; manually operable means for returning said automatic means to normal position; and a second manually operable means for controlling braking of said drum while said automatic means is held in normal position.

13. The combination of a rotary drum; power braking means therefor; a manual control for said braking means; automatic means responsive to abnormal conditions for applying said breaking means; manually operable means for releasing said automatic means; and means independent of said manual control for braking said drum while said manually operable means is in said releasing position.

14. The combination of a rotary drum; power braking means therefor; a manual control for said braking means; automatic means responsive to abnormal conditions for applying said braking means; manually operable means for returning said automatic means to normal position and releasing said braking means; and means independent of said manual control for braking said drum during the release of said power braking means.

15. The combination of a rotary drum; braking means therefor; a power mechanism for actuating said braking means; a manual control for said power mechanism; automatic means responsive to abnormal conditions and controlling said power mechanism to apply said braking means; manually operable means for releasing said automatic means; and a second brake applying means independent of said manual control and operable to brake said drum while said manually operable means is in releasing position.

In testimony whereof I have signed my name to this specification.

MORTEN SMITH-PETERSEN.